United States Patent
Kawamoto et al.

(10) Patent No.: US 6,557,843 B2
(45) Date of Patent: May 6, 2003

(54) DOCUMENT FEEDER WITH LINKING MECHANISM

(75) Inventors: Masuo Kawamoto, Osaka (JP); Hiroyuki Harada, Osaka (JP); Hideki Kitagawa, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 5 days.

(21) Appl. No.: 09/907,752

(22) Filed: Jul. 19, 2001

(65) Prior Publication Data

US 2002/0008351 A1 Jan. 24, 2002

(30) Foreign Application Priority Data

Jul. 24, 2000 (JP) ........................................ 2000-222046

(51) Int. Cl.⁷ .............................................. G03G 15/00
(52) U.S. Cl. ........................ 271/3.01; 271/7; 271/10.01; 399/380; 399/377; 399/379
(58) Field of Search .................................. 399/377, 379, 399/380, 367; 271/3.01, 4.01, 6, 7, 10.1

(56) References Cited

U.S. PATENT DOCUMENTS

| | | | | |
|---|---|---|---|---|
| 4,645,328 A | * | 2/1987 | Shiraki et al. | 399/208 |
| 4,990,952 A | * | 2/1991 | Watanabe | 355/50 |
| 5,220,393 A | * | 6/1993 | Otomo | 355/75 |
| 5,261,634 A | * | 11/1993 | Nakamura | 248/441.1 |
| 5,338,018 A | * | 8/1994 | Nagao et al. | 271/273 |
| 5,367,370 A | * | 11/1994 | Yoshida et al. | 271/162 |
| 5,470,051 A | * | 11/1995 | Morigami et al. | 271/275 |
| 5,881,351 A | * | 3/1999 | Shimotoso et al. | 399/377 |
| 6,006,064 A | * | 12/1999 | Hashimoto | 399/380 |
| 6,145,827 A | * | 11/2000 | Harada et al. | 271/10.01 |
| 6,324,362 B1 | * | 11/2001 | Yokoyama et al. | 399/107 |

FOREIGN PATENT DOCUMENTS

JP          2000-29251     *   1/2000

* cited by examiner

Primary Examiner—Patrick H. Mackey
(74) Attorney, Agent, or Firm—Smith, Gambrell & Russell, LLP

(57) ABSTRACT

An automatic document feeding apparatus of the present invention is arranged such that a transportation unit 24 (enclosing a pre-feeding roller 25, a pair of paper feeding rollers 26, a pair of resist rollers 27, a reading section 28, a pair of discharging rollers 29, etc.) is attached to a framework member 65 (a stay 66, a front-end plate 7, a rear-end plate 68, etc.) not fixedly, but in such a manner that at least the rearward end of the transportation unit 24 is capable of displacements in a vertical direction with respect to the framework member 65. Consequently, when the framework member 65 causes deflection, such deflection caused on the framework member 65 will not adversely affect an attachment state of the transportation unit 24.

2 Claims, 9 Drawing Sheets

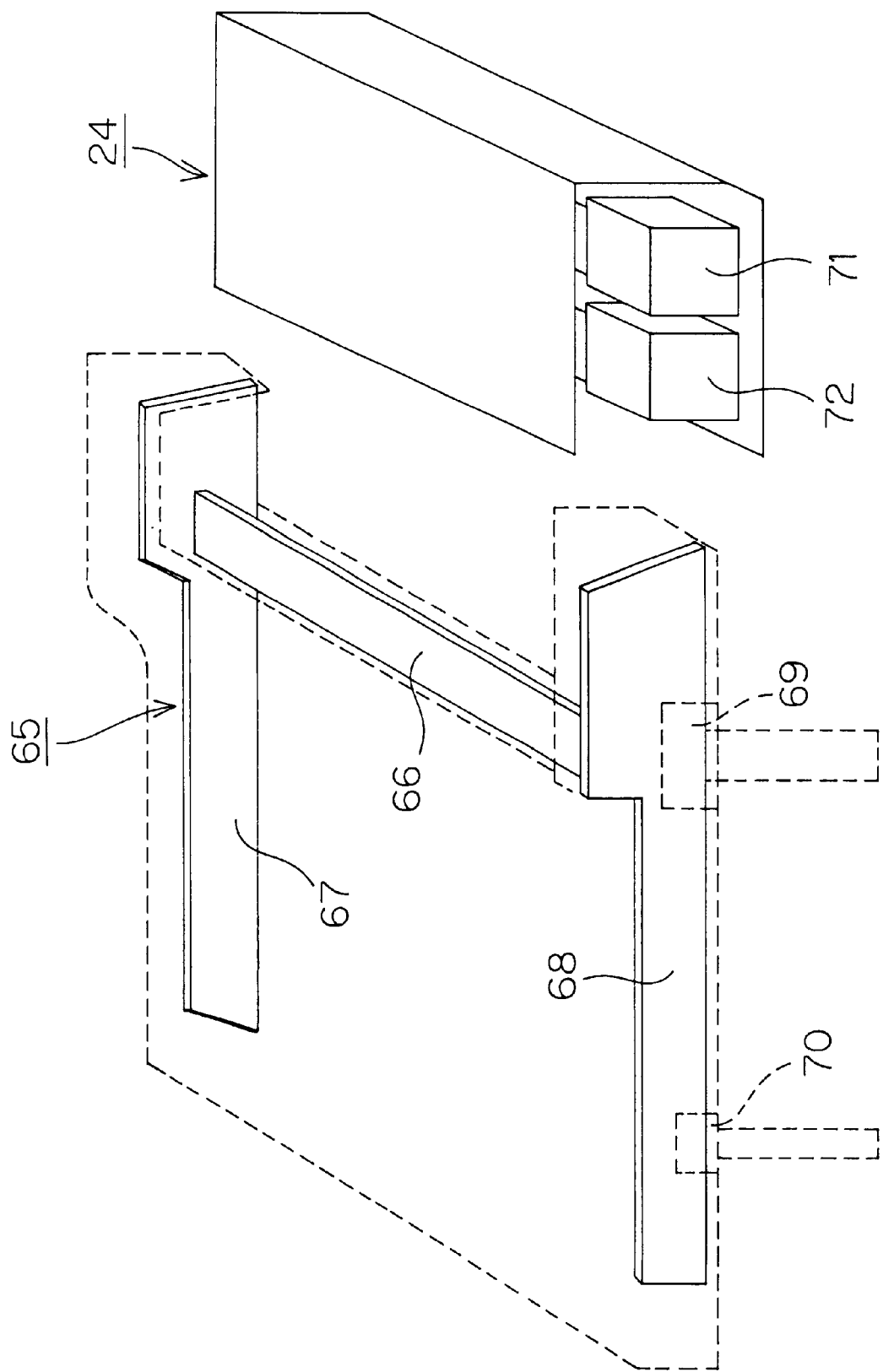

DOCUMENT FEEDER WITH LINKING MECHANISM

This application is based on an application No. 2000-222046 filed in Japan, the content of which is incorporated herein by reference.

BACKGROUND OF THE INVENTION

1. Field of the Invention

The present invention relates to an automatic document feeding apparatus, and more particularly to an improved automatic document feeding apparatus to stabilize a document transportation state at a document reading station.

2. Description of the Related Art

With reference to FIGS. 1 through 3, the following description will describe a conventional automatic document feeding apparatus adapted to a digital copying machine. FIG. 1 is a sectional front view showing a document transportation path in the automatic document feeding apparatus, FIG. 2 is a sectional plan view showing a framework of the automatic document feeding apparatus, and FIG. 3 is a sectional side view of the automatic document feeding apparatus, each being a diagrammatic illustration.

With reference to FIG. 1, an unillustrated document table is placed above a horizontal stay 1, and a document placed on the document table is fed by a pre-feeding roller 2 to be transported to a pair of resist rollers 4 by a pair of paper feeding rollers 3. The document is suspended by the pair of resist rollers 4, and then transported further from the pair of resist rollers 4, after which the document is discharged by a pair of discharging rollers 6 by way of a reading section 5 as is indicated by an arrow.

The pre-feeding roller 2, the pair of paper feeding rollers 3, the pair of resist rollers 4, and the pair of discharging rollers 6 are all enclosed in a transportation unit 7 indicated by a broken line. In other words, the automatic document feeding apparatus includes the transportation unit 7, which is unitized for ease of fabrication and assembly.

With reference to FIGS. 2 and 3, a front-end plate 8 is provided fixedly at the front end of the stay 1 and a rear-end plate 9 is provided fixedly at the rear end of the stay 1. The stay 1, front-end plate 8, and rear-end plate 9 form the framework of the automatic document feeding apparatus.

A first motor 10 for driving the pre-feeding roller 2 and the pair of paper feeding rollers 3, and a second motor 11 for driving the pair of resist rollers 4 and the pair of discharging rollers 6 are mounted on the rear-end plate 9.

In the automatic document feeding apparatus arranged in the above manner, two heavy motors 10 and 11 are unevenly provided at the rear end, and as a result, a load is applied to the rearward portion alone. This causes a longitudinal load imbalance on the document at the reading section 5. The load imbalance on the document at the reading section 5 may distort the document while it is fed forward.

On the other hand, when an operator sets a document on the reading table manually and makes a copy without using the automatic document feeding function, the operator closes and opens the automatic document feeding apparatus. Because the entire automatic document feeding apparatus is quite heavy, a spring such that pushes the automatic document feeding apparatus in an opening direction is incorporated in a hinge 12 provided at the rearward portion, so that the operator can manipulate the automatic document feeding apparatus easily. The automatic document feeding apparatus is kept pushed in the opening direction by the pushing force of the spring. Hence, the stay 1 may cause deflection as it deteriorates with time. Because the transportation unit 7 is provided fixedly to the stay 1, deflection of the stay 1 causes the transportation unit 7 to be displaced from a predetermined position, which poses a problem that a document transportation direction is displaced by the transportation unit 7.

Further, when deflection of the stay 1 makes it difficult for the transportation unit 7 to closely adhere onto the reading table, the operator has to press the front end of the automatic document feeding apparatus hard against the reading table to closely adhere the transportation unit 7 to the reading table. For this reason, at the bottom of the front end, the conventional automatic document feeding apparatus is occasionally provided with a magnet that develops a force to attract the front end of the automatic document feeding apparatus closely to the reading table. The attracting force of the magnet contributes to close adhesion of the transportation unit 7 to the reading table. However, the operator has to apply a large force when he opens the automatic document feeding apparatus, which poses a problem that the apparatus becomes less easy to manipulate.

SUMMARY OF THE INVENTION

The present invention is devised with the above backgrounds, and has a principal object to provide an automatic document feeding apparatus capable of transporting a document in a satisfactory manner.

Another object of the present invention is to provide an improved automatic document feeding apparatus such that a load is applied evenly onto a document being transported.

Still another object of the present invention is to provide an automatic document feeding apparatus that is easy to manipulate, in particular, easy to open and close.

The present invention relates to an automatic document feeding apparatus characterized in that a transportation unit (a unit enclosing a pre-feeding roller, a pair of paper feeding rollers, a pair of resist rollers, a reading section, a pair of discharging rollers, etc.) is attached to a framework forming member (a stay, a front-end plate, a rear-end plate, etc.) not fixedly, but in such a manner that at least a rearward end of the transportation unit is capable of displacements in a vertical direction (in a direction to move towards or away from a reading table) with respect to the framework member.

The automatic document feeding apparatus attached to a copying machine or the like is frequently opened and closed with respect to the main body housing of the copying machine or the like. More specifically, because the copying machine or the like does not always operate in the automatic document feeding mode and the documents are often set manually, the automatic document feeding apparatus is opened and closed quite frequently. Hence, if the framework forming member of the automatic document feeding apparatus causes deflection, the position of the transportation unit on the reading table changes slightly when the automatic document feeding apparatus is closed. Such a change in the position of the transportation unit on the reading table adversely affects the document feeding and reading jobs.

According to the arrangement of the present invention, however, even when the framework forming member causes deflection, because the transportation unit is attached to the framework forming member in such a manner that it is capable of displacements, the deflection caused on the framework member will not adversely affect an attachment state of the transportation unit. Consequently, the positioning of the transportation unit is carried out at an exact predetermined position on every occasion, and a document is transported in a satisfactory manner.

According to a preferred embodiment of the present invention, the rearward end of the transportation unit is attached to the framework forming member in such a manner that it is capable of displacements in a vertical direction, and the frontward end of the transportation unit is attached to the framework forming member in such a manner that it is capable of displacements in the longitudinal direction. Hence, the rearward end of the transportation unit remains at a predetermined position in the longitudinal direction with respect to the framework forming member all the time. Moreover, when the framework forming member causes deflection in the longitudinal direction, the transportation unit remains unaffected by such deflection and maintains a certain attachment state, thereby making it possible to transport a document in a satisfactory manner.

These and other objects of the invention and the arrangements of the invention will become more apparent from the following detailed description with reference to the accompanying drawings.

BRIEF DESCRIPTION OF THE DRAWINGS

FIG. 7 is a view explaining an arrangement of a framework member of an automatic document feeding apparatus according to one embodiment of the present invention;

DESCRIPTION OF PREFERRED EMBODIMENTS

Figure 4:
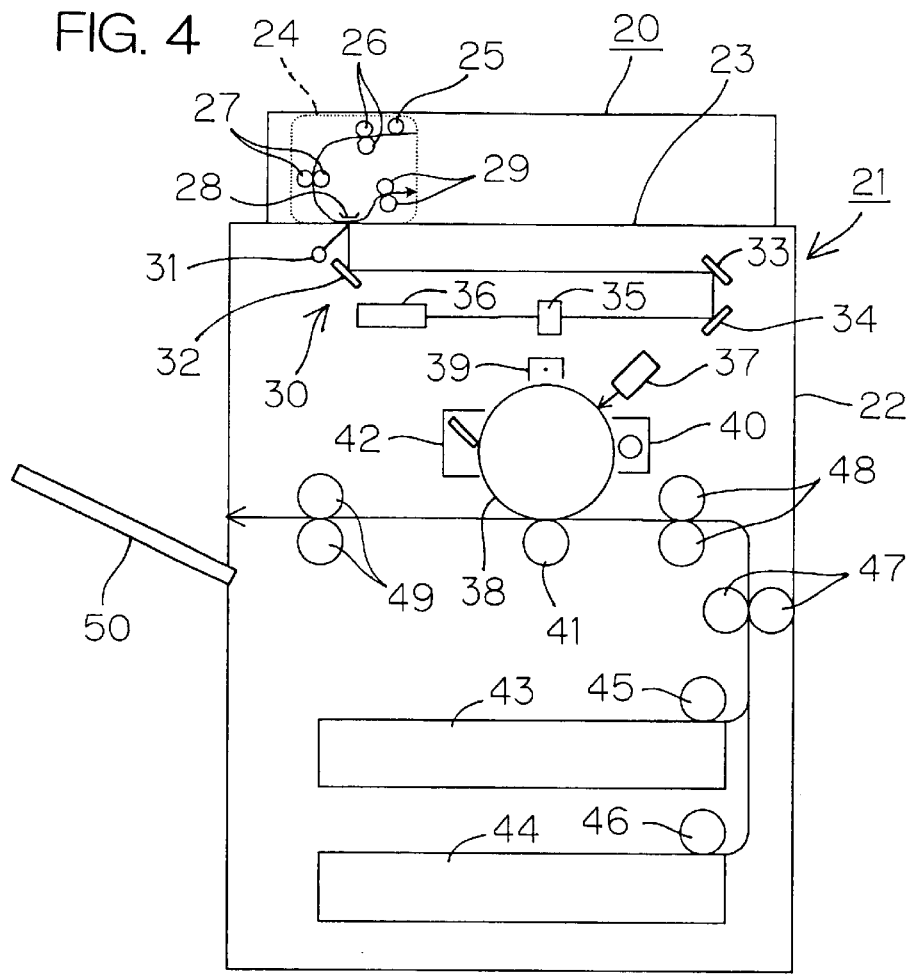
FIG. 4 is a diagrammatic cross section of a digital copying machine, as viewed from the front, adapting an automatic document feeding apparatus according to one embodiment of the present invention.

FIG. 4 is a diagrammatic cross section of a digital copying machine 21, as viewed from the front, adapting an automatic document feeding apparatus 20 in accordance with one embodiment of the present invention. In the digital copying machine 21, a top surface 23 of a main body housing 22 serves as a reading table (a platen glass plate onto which a document to be copied is set). The automatic document feeding apparatus 20 is attached over the reading table 23 in such a manner that it is allowed to open and close. While the automatic document feeding apparatus 20 is brought into contact with the reading table 23 as is shown in the drawing, a document is transported automatically by the automatic document feeding apparatus 20. On the other hand, while the automatic document feeding apparatus 20 is opened, the operator can set a document manually on the reading table 23.

The automatic document feeding apparatus 20 includes a transportation unit 24. The transportation unit 24 encloses a pre-feeding roller 25 that feeds documents forward one by one, a pair of paper feeding rollers 26, a pair of resist rollers 27, a reading section 28, a pair of discharging rollers 29, etc.

An optical system 30 is provided at the top in the interior of the main body housing 22. When a document is fed by the transportation unit 24, the document traveling beneath the reading section 28 is illuminated, whereby the content of the document is read. The optical system 30 includes three reflection mirrors 32, 33 and 34 for guiding light emitted from two illuminating lamps 31 and reflected from the document, a lens 35 for collecting the reflected light, and a CCD 36. Data read by the CCD 36 undergoes signal processing, after which it is emitted to a photosensitive drum 38 from a laser 37 in the form of a laser beam. The photosensitive drum 38 is surrounded by a charging charger 39, a developing device 40, a transferring roller 41 and a cleaner 42, so that a toner image is developed by the electrophotographic technique.

Pull-out type paper trays 43 and 44 are provided at the bottom in the interior of the main body housing 22. Sheets of paper in the paper trays 43 and 44 are fed one by one by feeding rollers 45 and 46, respectively, and transported to the photosensitive drum 38 by way of a pair of transportation rollers 47 and a pair of resist rollers 48. Then, a toner image formed on the photosensitive drum 38 is transferred onto the sheet by the transferring roller 41, and the toner image transferred onto the sheet is fixed thereon by a pair of fixing rollers 49, after which the sheet is discharged onto a discharge tray 50.

Figure 5:
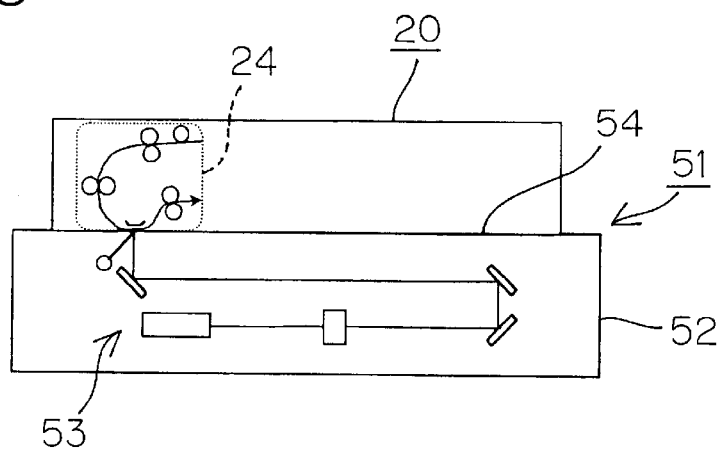
FIG. 5 is a diagrammatic cross section of a scanner, as viewed from the front, adapting an automatic document feeding apparatus according to one embodiment of the present invention.

As shown in FIG. 5, the automatic document feeding apparatus 20 according to one embodiment of the present invention may be also adapted to a scanner 51. In the drawing, numeral 52 denotes a main body housing of the scanner 51, and an optical system 53 is provided in the interior of the main body housing 52. The optical system 53 is of substantially the same arrangement as the optical system 30 in the digital copying machine 21 explained with reference to FIG. 4.

The top surface 54 of the main body housing 52 serves as the document reading table (platen glass plate), to which the automatic document feeding apparatus 20 is attached in such a manner that it is allowed to open and close. The automatic document feeding apparatus 20 adapted to the scanner 51 is of the same arrangement as the counterpart adapted to the digital copying machine 21 explained with reference to FIG. 4. In short, the automatic document feeding apparatus 20 includes the transportation unit 24.

As has been discussed, the automatic document feeding apparatus of the present invention can be adapted to both an image forming apparatus such as a digital copying machine, and a scanner.

Figure 6A:
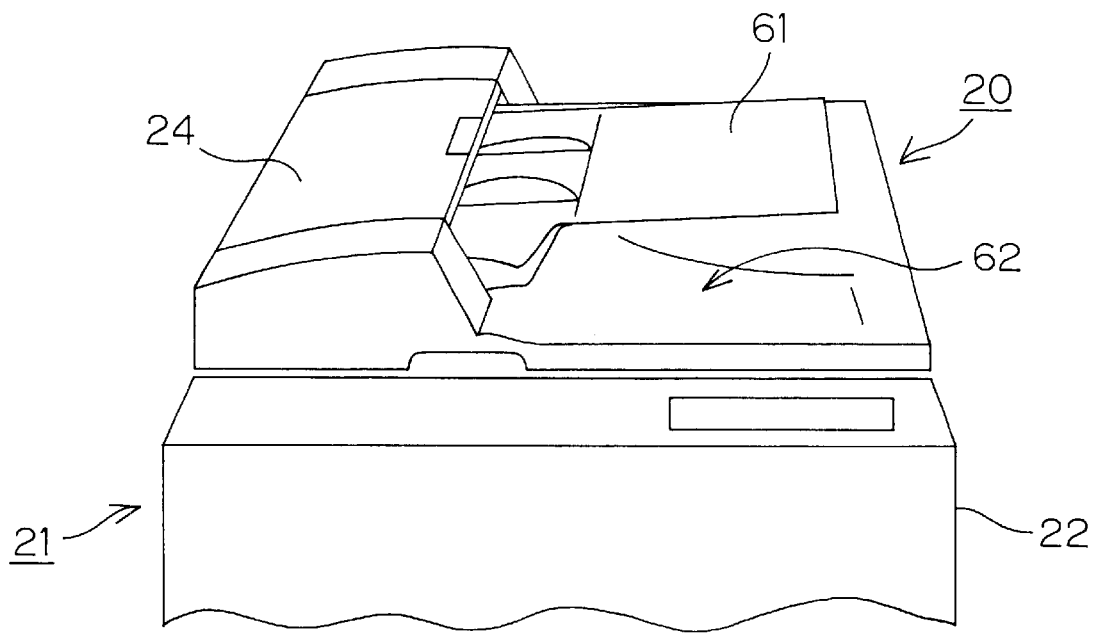
FIGS. 6A and 6B are partial perspective views each showing an outward appearance of a digital copying machine adapting an automatic document feeding apparatus according to one embodiment of the present invention.
Figure 6B:
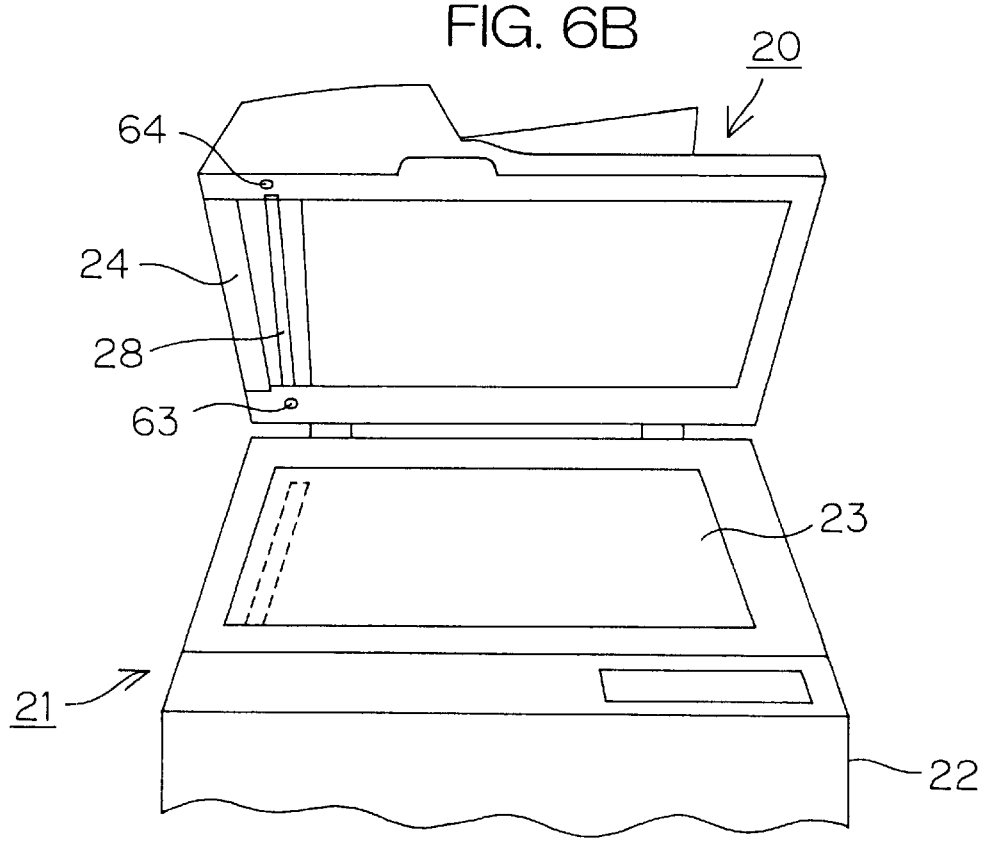

FIGS. 6A and 6B are partial perspective views each showing an outward appearance of the digital copying machine 21 having the automatic document feeding apparatus 20 according to one embodiment of the present invention. FIG. 6A shows a state where the automatic document feeding apparatus 20 is closed, and FIG. 6B shows a state where the automatic document feeding apparatus 20 is opened.

The automatic document feeding apparatus 20 is provided with the transportation unit 24 at the left as viewed from the front. The top surface at the right of the automatic document feeding apparatus 20 serves as a document discharge table 62, and above which, a document set table 61 is provided. Documents set on the document set table 61 are fed into the transportation unit 24 one by one, and discharged onto the document discharge table 62 after the content thereof is read.

As shown in FIG. 6B, when the automatic document feeding apparatus 20 is in the open state, one can visually recognize the reading section 28 enclosed in the transportation unit 24. The reading section 28 is provided with bosses 63 and 64 made of an elastic material at its rear edge and front edge, respectively. When the automatic document feeding apparatus 20 is closed, these bosses 63 and 64 touch the reading table 23 of the main body housing 22, whereby the positioning of the reading section 28 is carried out at an exact predetermined position with respect to the reading table 23 in a stable manner.

FIG. 7 is a view for explaining an arrangement of a framework member 65 of the automatic document feeding apparatus 20. Shown in FIG. 7 is a perspective view of the automatic document feeding apparatus 20 as viewed from behind with the transportation unit 24 being detached.

The automatic document feeding apparatus 20 includes a stay 66 that extends in the longitudinal direction, a front-end plate 67 provided fixedly to a front edge of the stay 66, and a rear-end plate 68 provided fixedly to a rear edge of the stay 66. In addition, a main hinge mechanism 69 and a sub hinge mechanism 70 are attached to the rear-end plate 68, and these two hinge mechanisms 69 and 70 allow the automatic document feeding apparatus 20 to be attached in such a manner that it is able to open and close with respect to the digital copying machine 21 or the like.

As has been discussed above, the transportation unit 24 encloses various kinds of rollers and the reading section, and incorporates motors 71 and 72 for driving these rollers at the rearward end. When the transportation unit 24 is assembled, it is linked to the framework member 65 in such a manner that it is capable of elastic displacements, which will be described below.

Figure 8A:
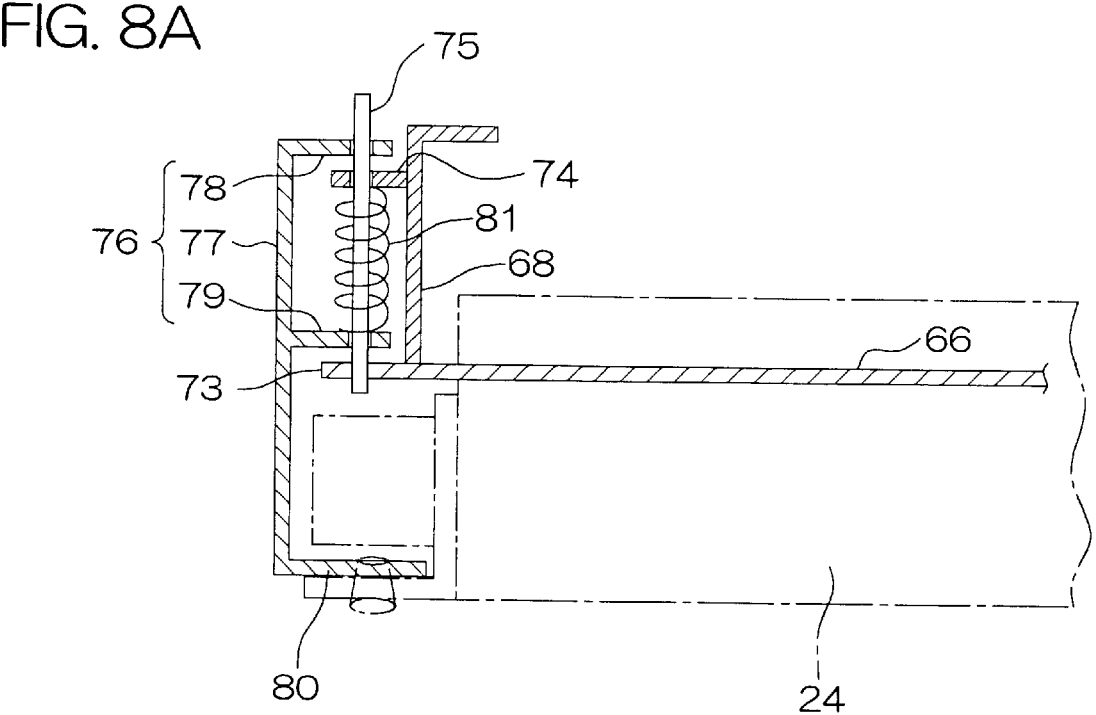
FIGS. 8A and 8B are views each showing a linking state between a rear edge of a transportation unit and a framework member.
Figure 8B:
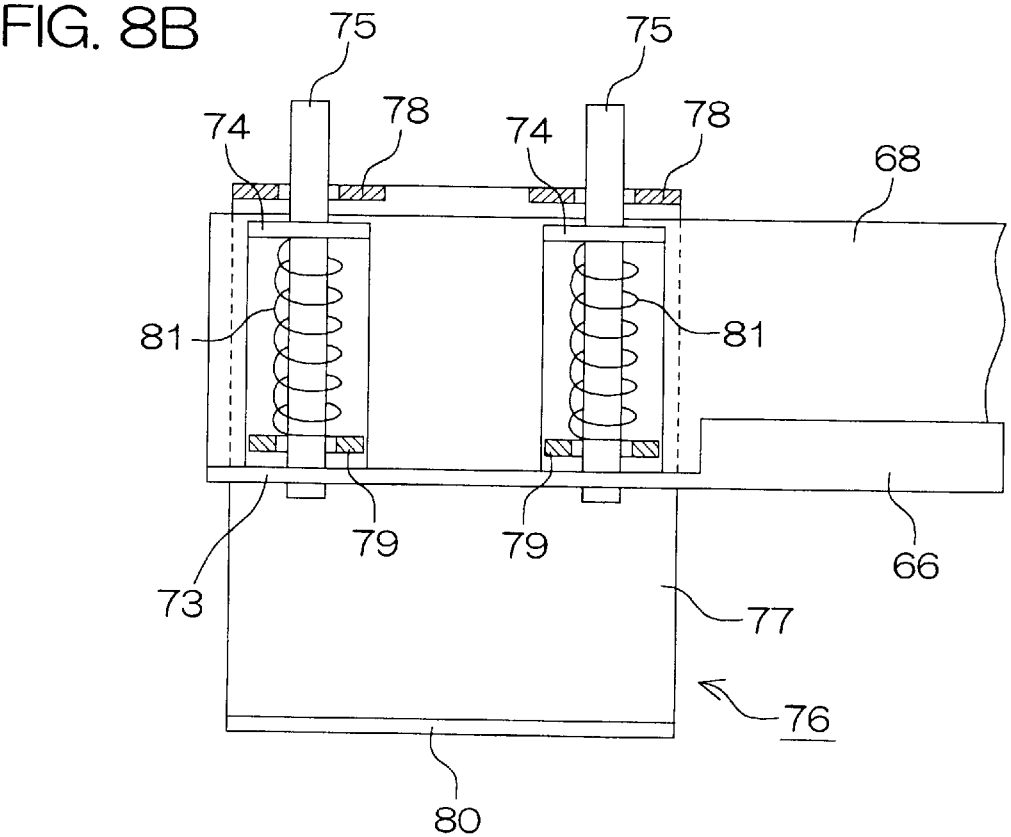

FIGS. 8A and 8B are views each showing a linking state between the rear edge of the transportation unit 24 and the framework member 65. FIG. 8A is a view as viewed from the left, and FIG. 8B is a view as viewed from the front.

The stay 66 is a metal member extending horizontally in the longitudinal direction, and the rear-end plate 68, which is made of metal and overhangs upward in a direction that intersects at right angles with the stay 66, is provided fixedly to the rear edge portion of the stay 66. Further, supporting ribs 73 and 74 made of metal are provided in such a manner so as to protrude toward the rear surface of the rear-end plate 68. The supporting ribs 73 and 74 support a vertically extending column 75 made of metal. The column 75 is supported by the supporting rib 73 at the bottom and by the supporting rib 74 at the top.

Further, a movable plate 76 made of metal is provided. The movable plate 76 includes a main section 77 extending vertically, a linking piece 78 overhanging frontward from the top end, another linking piece 79 overhanging frontward from the center in the vertical direction, and an attachment section 80 overhanging frontward from the bottom end. Each of the linking pieces 78 and 79 is provided with a hole, into which the column 75 is inserted. In other words, the movable plate 76 is capable of displacements in the vertical direction as it is guided by the column 75. In addition, a coil spring 81 is fitted into a space between the supporting rib 74 and linking piece 79 around the column 75. As a result, the movable plate 76 is kept pushed downward elastically by the coil spring 81, which allows upward displacements of the movable plate 76 against the elastically forth of the coil spring 81.

As shown in FIG. 8B, two sets of the arrangements, each including the column 75 and coil spring 81, are provided from side to side.

The transportation unit 24 indicated by a broken line is secured to the attachment section 80 by screws at the rearward portion. Hence, the rear edge of the transportation unit 24 is attached to the framework member 65 including the stay 66 and rear-end plate 68, through the movable plate 76, such that it is capable of displacements in the vertical direction.

Figure 9A:
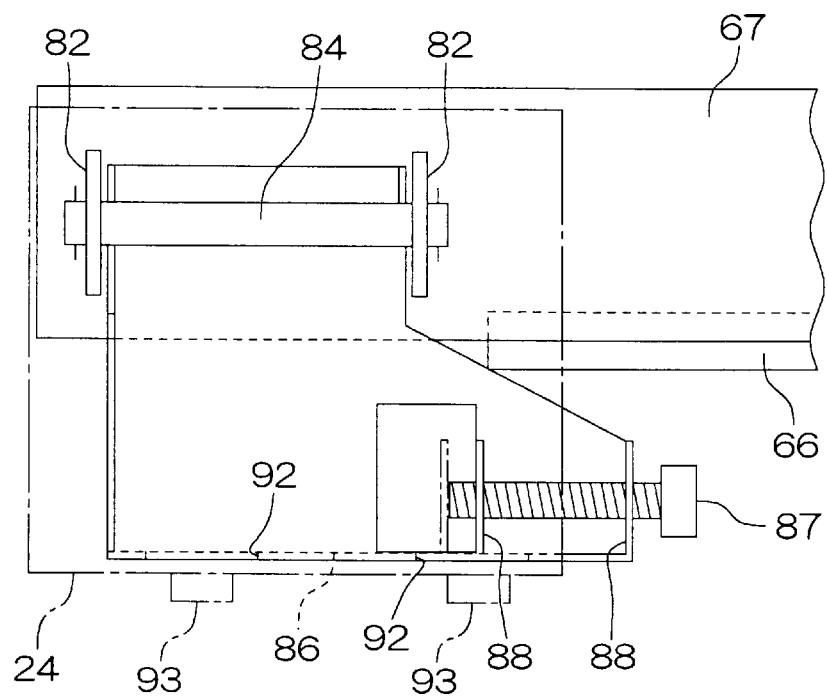
FIGS. 9A and 9B are views each showing a linking structure for linking a front end of a transportation unit to a framework member.
Figure 9B:
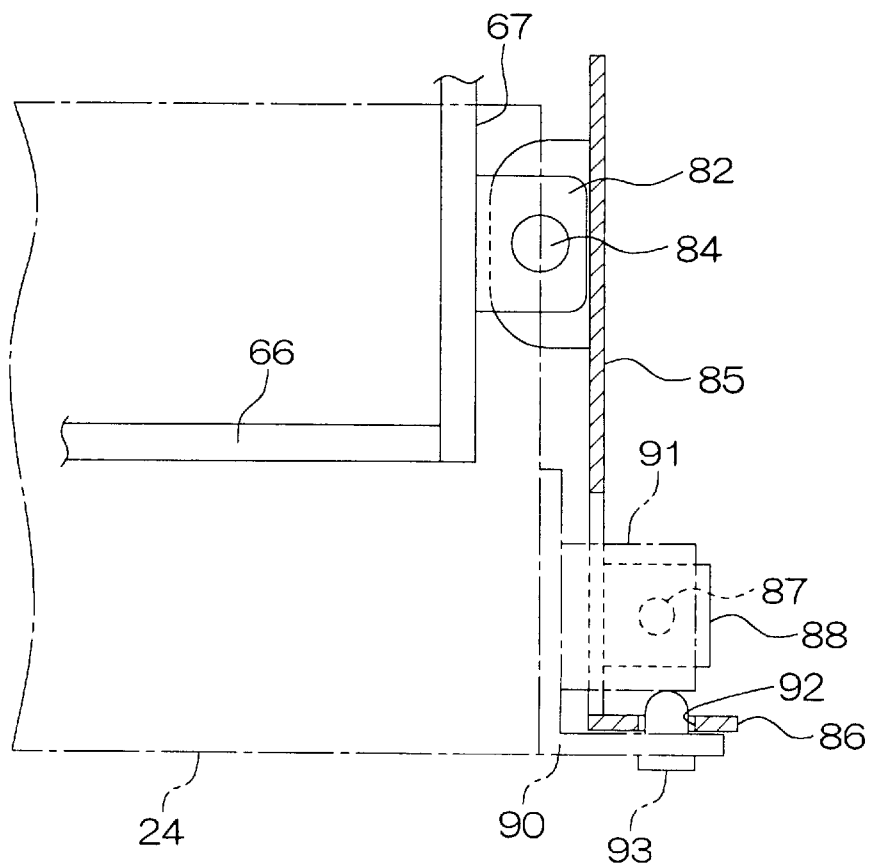

FIGS. 9A and 9B are views each showing a linking structure for linking the front end of the transportation unit 24 to the framework member 65. FIG. 9A is a view as viewed from the rear end, and FIG. 9B is a view as viewed from the right. The stay 66 extends horizontally in the longitudinal direction, and the front-end plate 67 made of metal, which extends in the lateral direction and thereby intersects at right angles with the stay 66 in its lengthwise direction, is provided fixedly at its front edge. The front-end plate 67 is provided with a pair of supporting pieces 82 spaced apart from each other by a predetermined distance in a lateral direction and protruding frontward, and an axis 84 extending horizontally in the lateral direction is penetrated between the supporting pieces 82. Here, the axis 84 holds an oscillating plate 85 made of metal. The bottom portion of the oscillating plate 85 is allowed to oscillate in the longitudinal direction around the axis 84. The oscillating plate 85 is provided with an attachment section 86 at the bottom end, and the front edge portion of transportation unit 24 is secured to the attachment section 86 by screws. Hence, the front edge portion of the transportation unit 24 fixed to the oscillating plate 85 is capable of displacements in the longitudinal direction within a predetermined range.

The oscillating plate 85 is also provided with an attachment position adjusting screw 87, which penetrates through a pair of supporting pieces 88 each protruding frontward from the oscillating plate 85. On the other hand, an L-shape link 90 is provided fixedly to the front edge portion of the transportation unit 24. The L-shape link 90 is provided with a receiving piece 91 protruding frontward. Also, the L-shape link 90 is provided with a long hole 92 expanding in the lateral direction, which is necessary when secured to the attachment section 86 with screws. A screws 93 are fitted into the long hole 92 from downward and then screwed into the attachment section 86, so that the L-shape link 90, that is, the front edge portion of the transportation unit 24 is attached to the oscillating plate 85. Here, as the attachment position adjusting screw 87 is screwed while the screws 93 are slightly loosened, the tip end of the screw 87 pushes the receiving piece 91, whereby it is possible to make fine adjustments of the positions of the L-shape link 90 and oscillating plate 85 in the lateral direction.

Figure 1:
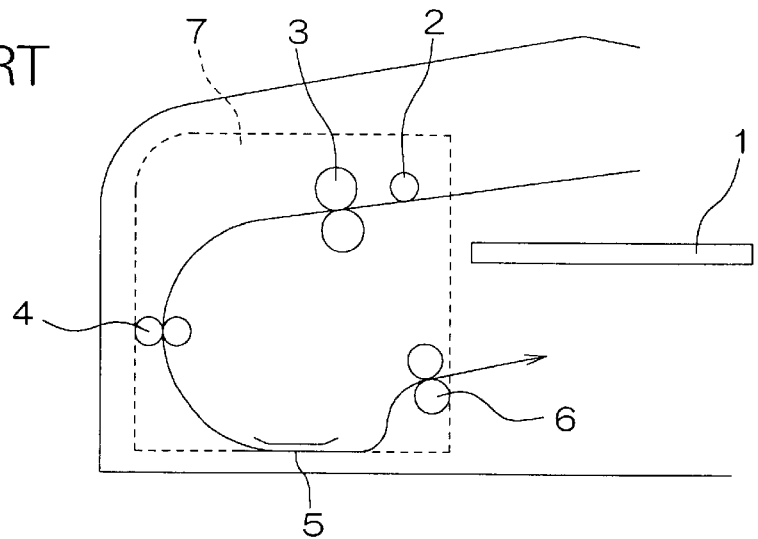
FIG. 1 is a sectional front view showing a document transportation path in an automatic document feeding apparatus.
Figure 2:
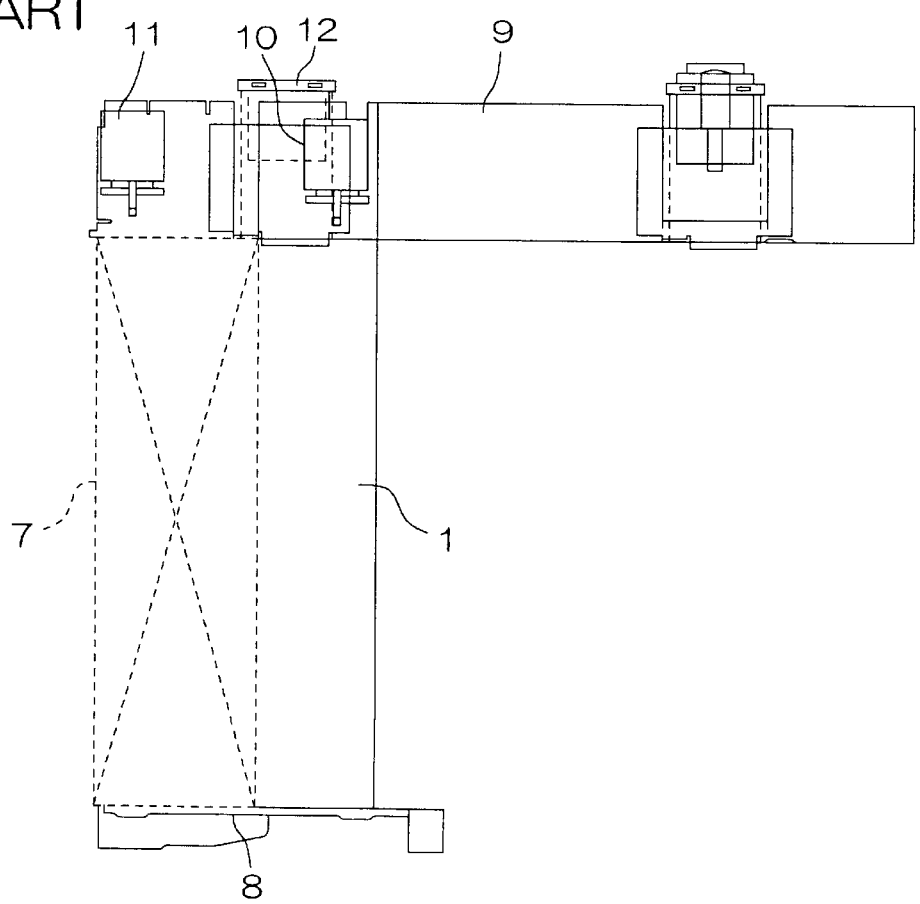
FIG. 2 is a sectional plan view showing a framework of the automatic document feeding apparatus of FIG. 1.
Figure 3:
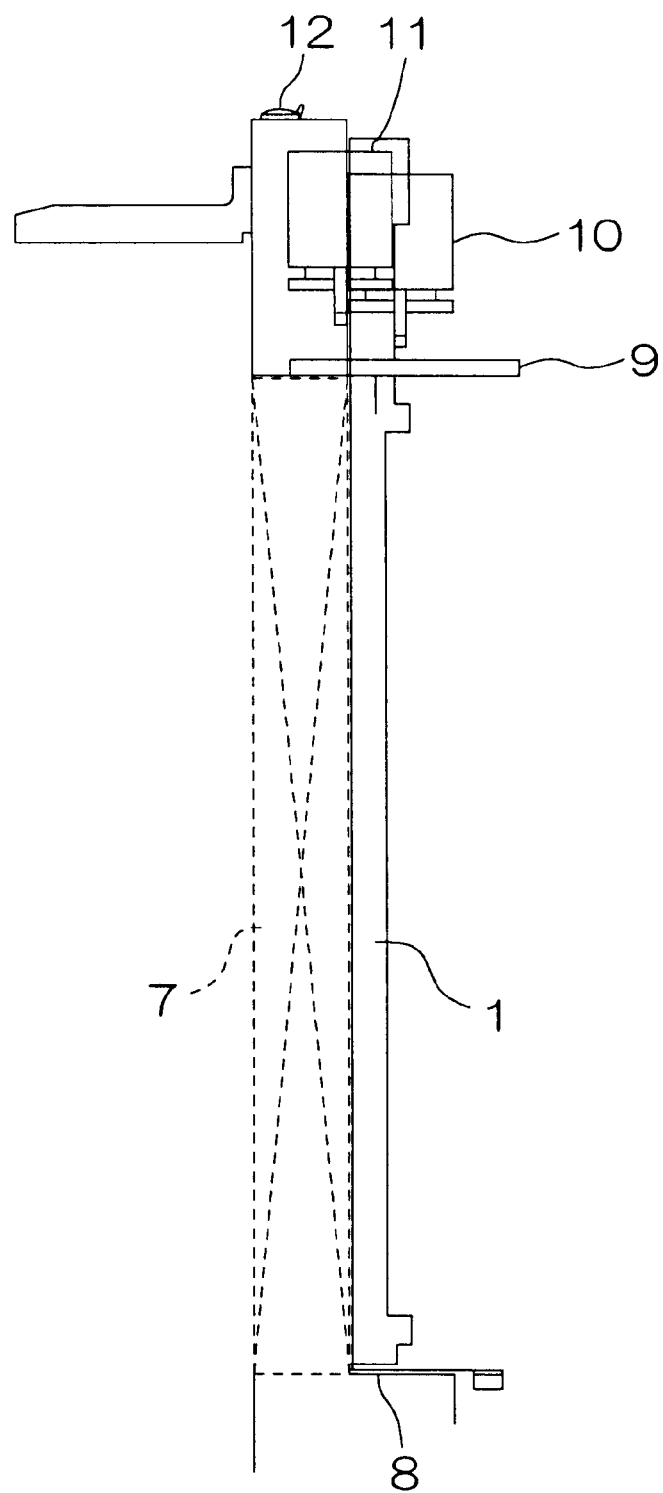
FIG. 3 is a sectional side view of the automatic document feeding apparatus of FIG. 1.
Figure 10A:
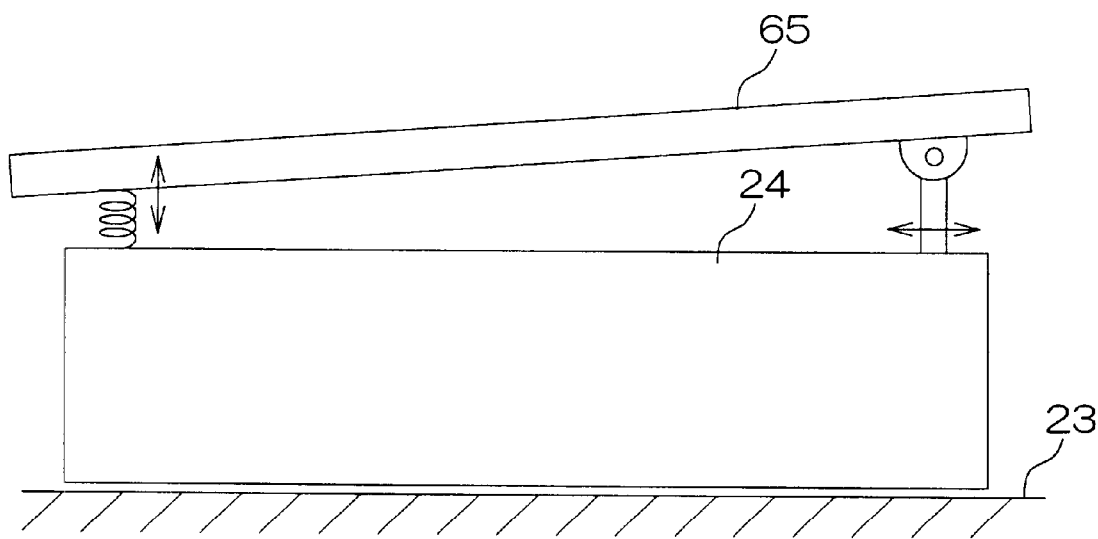
FIGS. 10A and 10B are diagrammatic views explaining the function and effect of an attachment structure of a transportation unit according to one embodiment of the present invention.
Figure 10B:
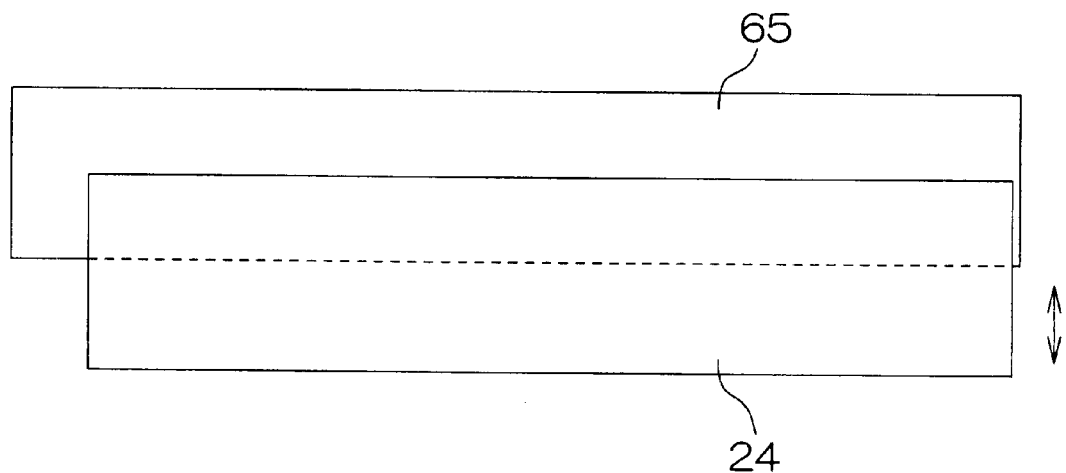

FIGS. 10A and 10B are diagrammatic views for explaining function and effect of the attachment structure of the transportation unit 24 according to one embodiment of the present invention. As shown in FIG. 1A, the rearward portion of the transportation unit 24 is capable of elastic displacements in the vertical direction with respect to the framework member 65, whereas the frontward portion of the transportation unit 24 is capable of displacements in the longitudinal direction. Consequently, even when the framework member 65 causes deflection, the positional relation of the transportation unit 24 with respect to the top surface 23 of the main body housing serving as the document reading table remains intact.

In particular, when the automatic document feeding apparatus 20 is closed on the reading table 23, the position of the transportation unit 24 on the contact glass is determined with reference to the rear edge portion of the transportation unit 24. As a result, it is possible to place the transportation unit 24 at a predetermined position in the longitudinal direction with respect to the reading table 23 in a reliable manner.

Besides, by adjusting the attachment position adjusting screw 87 (see FIGS. 9A and 9B), the position of the frontward portion of the transportation unit 24 can be adjusted in the lateral direction as shown in FIG. 10B. Accordingly, the position of the transportation unit 24 can be adjusted after it is attached to the framework member 65, thereby making it possible to maintain the transportation unit 24 at an optimal position for document transportation without fail.

Figure 11:
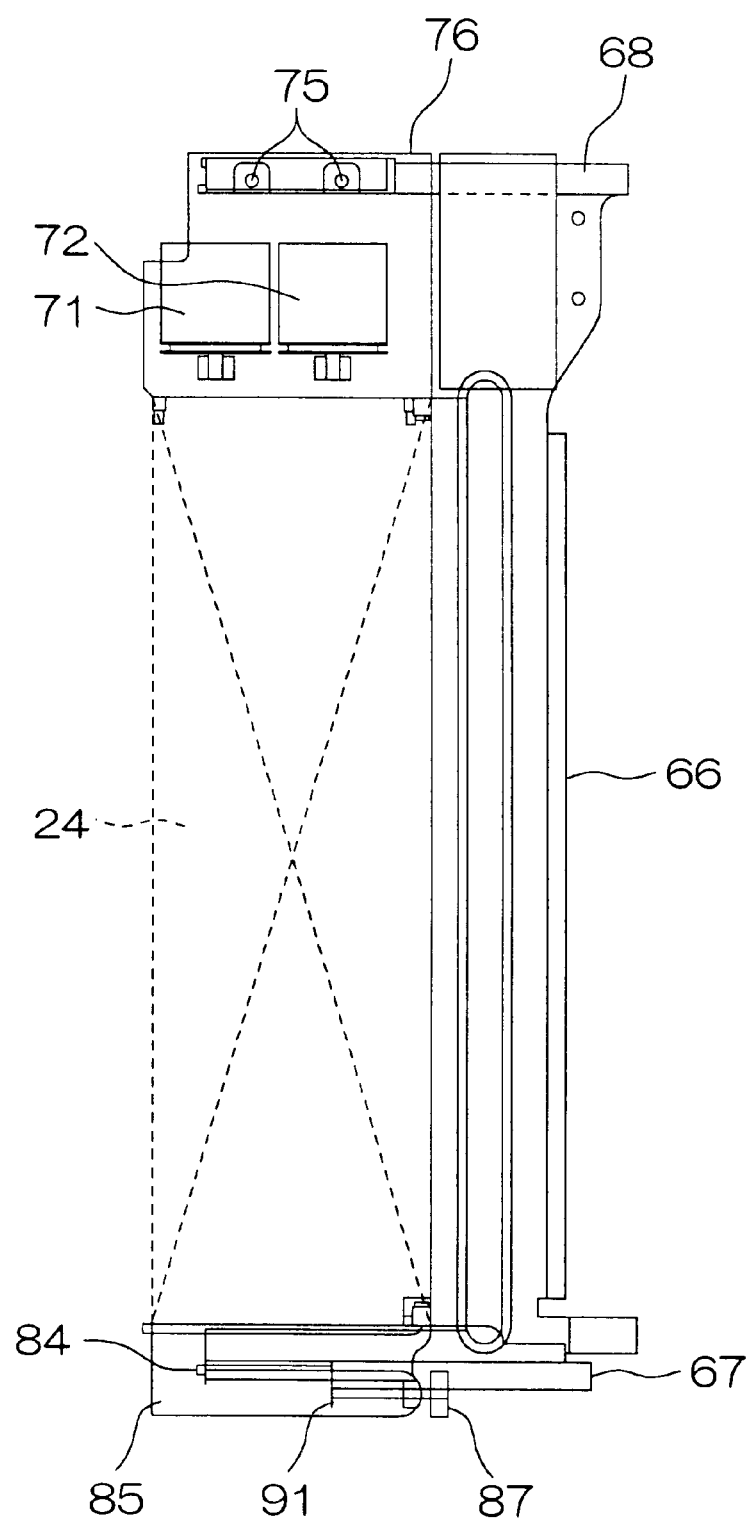
FIG. 11 is a plan view showing a relation between a framework member and a transportation unit.

FIG. 11 is a plan view showing a relation between the framework member 65 and transportation unit 24. In the drawing, numeral 66 denotes the stay, numeral 67 denotes the front-end plate, and numeral 68 denotes the rear-end plate, which altogether form the framework member 65. Numeral 24 indicated by a broken line denotes the transportation unit. Numeral 75 denotes the column, numeral 84 denotes the axis, numeral 85 denotes the oscillating plate, and numeral 87 denotes the attachment position adjusting screw.

The above embodiment discussed an example of the attachment structure of the transportation unit to the framework member, in which the transportation unit extending in the longitudinal direction is linked to the framework member in such a manner that the rearward portion thereof is capable of elastic displacements in the vertical direction, while the frontward portion thereof is allowed to oscillate in the longitudinal direction. It should be appreciated, however, that the present invention is not limited to the above embodiment. For example, the transportation unit may be attached to the framework member in such a manner that its both the rearward portion and frontward portion are capable of elastic displacements in the vertical direction.

What is claimed is:

1. An automatic document feeding apparatus, comprising:
a framework forming member for forming a framework of the apparatus, said framework forming member including
   a stay extending in a longitudinal direction of the apparatus,
   a front-end plate provided fixedly to a front edge of said stay and protruding in a direction that intersects at right angles with the longitudinal direction along which said stay extends, and
   a rear-end plate provided fixedly to a rear edge of said stay and protruding in the direction that intersects at right angles with the longitudinal direction along which said stay extends;
a transportation unit incorporating document transporting rollers into one unit, said document transporting rollers including a pre-feeding roller, a paper feeding roller, a resist roller, and a discharge roller, wherein an axis of each of said document transporting rollers incorporated into said transportation unit extends in the longitudinal direction along which said stay extends; and
linking means for linking said transportation unit to said framework forming member in such a manner that said transportation unit is capable of displacements within a predetermined range, wherein
   said linking means includes front linking means and rear linking means, by which the front edge and rear edge of said transportation unit are linked to said framework forming member, respectively;
   said front linking means links the front edge of said transportation unit to said framework forming member in such a manner that the front edge is allowed to oscillate in the longitudinal direction and includes a fine adjustment mechanism for making fine adjustment of a linking position of the front edge of said transportation unit to said framework forming member in a lateral direction; and
   said rear linking means links the rear edge of said transportation unit to said framework forming member and pushes the rear edge of said transportation unit downward elastically, and the rear edge of said transportation unit is linked to said framework forming member in such a manner that the rear edge is capable of upward displacements against an elastic force developed by said rear linking means.

2. The automatic document feeding apparatus according to claim 1, wherein:
a rearward portion of said framework forming member is further provided with a hinge mechanism, through which the automatic document feeding apparatus is attached to apparatuses including an image forming apparatus and a scanner in such a manner that the automatic document feeding apparatus is allowed to open and close.

* * * * *